RECORDING EQUIPMENT

Filed Dec. 31, 1962 5 Sheets-Sheet 1

INVENTOR.
Huntly D. Millar
BY
Symmestvedt & Lechner
ATTORNEYS

May 25, 1965 H. D. MILLAR 3,185,990

RECORDING EQUIPMENT

Filed Dec. 31, 1962 5 Sheets-Sheet 2

INVENTOR.
Huntley D. Millar

BY
Sprunstedt & Lechner
ATTORNEYS

INVENTOR.
Huntly D. Millar
BY
Synnestvedt & Lechner
ATTORNEYS

May 25, 1965 H. D. MILLAR 3,185,990

RECORDING EQUIPMENT

Filed Dec. 31, 1962 5 Sheets-Sheet 4

INVENTOR.
Huntly D. Millar

BY

ATTORNEYS

May 25, 1965 H. D. MILLAR 3,185,990

RECORDING EQUIPMENT

Filed Dec. 31, 1962 5 Sheets-Sheet 5

INVENTOR
Huntly D. Millar
BY
Synnestvedt & Lechner
ATTORNEYS

United States Patent Office 3,185,990

Patented May 25, 1965

3,185,990

RECORDING EQUIPMENT

Huntly D. Millar, Houston, Tex., assignor to E & M Instrument Co., Inc., Houston, Tex., a corporation of Texas Filed Dec. 31, 1962, Ser. No. 248,475
8 Claims. (Cl. 346—112)

This invention relates to recording equipment and is particularly concerned with recording equipment of the type utilizing a travelling record element such as a strip of paper on which it is desired to record one or more traces corresponding to one or more variables.

In equipment of the type referred to, an oscillatable shaft, for instance the shaft of a galvanometer, is oscillatively driven in either direction from a mid position in accordance with a variable to be recorded. In a system of this kind, the rotation of oscillation of the galvanometer shaft is proportional to the potential applied to the galvanometer. Moreover in typical equipment heretofore used for this purpose, the galvanometer shaft has been employed to oscillatively actuate a stylus carrying a pen tip engaging the record element, thereby producing arcuate traces corresponding to the deflections of the galvanometer.

Such a system, producing arcuate traces, has the disadvantage that deflections from the mid position or center line must be measured arcuately rather than in a straight line perpendicular to the center line, and such measurements are inconvenient, requiring curvilinear coordinates on the recording chart or record element. In addition, time relationships between a plurality of variables being recorded by two or more such systems all cooperating with a single chart may not be studied directly but must first be corrected for arc distortion, and this is true even where the galvanometers are all aligned perpendicular to the direction of motion of the record element. In spite of such alignment, the writing or pen points of the several styli will be misaligned dependent upon their individual deviations or deflections from their respective center lines.

Various attempts have been made to overcome the foregoing disadvantages of the known systems, producing arcuate traces in the manner above referred to. For example it has been proposed to incorporate into the system some springs requiring bending in order to convert the angular oscillative motion of the galvanometer into a straight line motion so as to produce a straight line trace. It has also been proposed to employ some linkages in the system incorporating sliding joints. While it is possible by various of these means to produce a straight line or rectilinear trace from the rotative or angular motion of the galvanometer shaft, these prior proposals have also been subject to certain difficulties, notably the fact that they require considerable power to drive them in relation to the available power or torque in galvanometers of normal construction or design. Moreover various of these prior art systems tend to distort the response, so that the increments of straight line motion delivered to the chart are no longer closely proportional to the angular increments of the motion of the galvanometer shaft.

The present invention overcomes the foregoing difficulties and provides a system for translating the angular motions of the galvanometer shaft into traces which are not only substantially straight or rectilinear but which are also incrementally accurately proportioned in relation to the angular motions of the galvanometer, and this is accomplished according to the present invention by an arrangement which is readily actuated by the torque available in galvanometers of normal design.

How the foregoing objects and advantages are obtained will appear more fully from the following description referring to the accompanying drawings in which.

Figures 4, 5, 6:
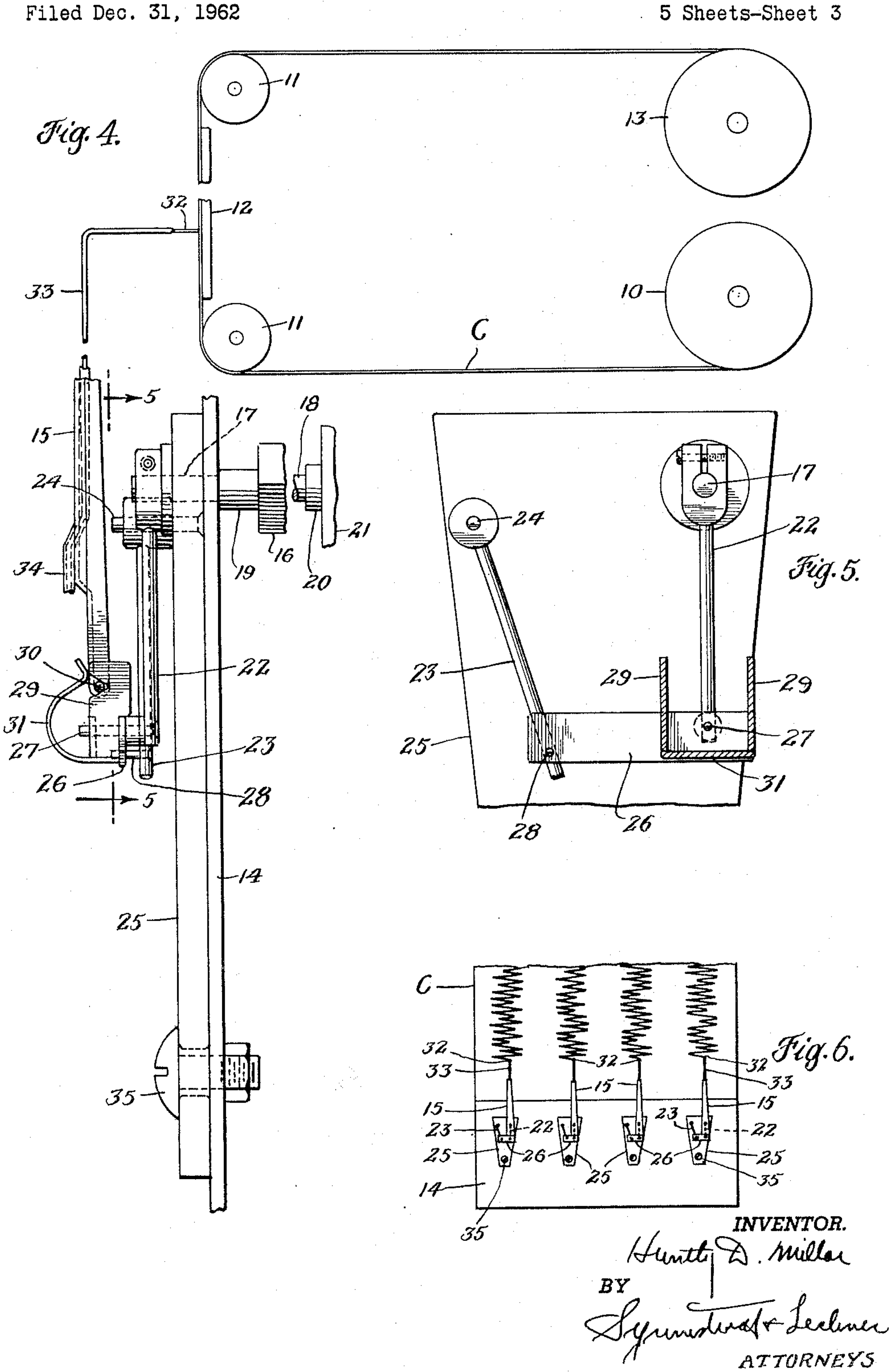
FIGURE 4 is a view on an enlarged scale taken from the right hand side of the equipment as indicated by the line 4—4 in FIGURE 1, and further showing the cooperation of a writing point carried by the stylus with a record element in the form of a chart or paper strip.
FIGURE 5 is a view of certain details taken as indicated by the line 5—5 applied to FIGURE 4.
FIGURE 6 is a small scale plan view of a group of devices such as the device shown in FIGURES 1 to 5 inclusive arranged to cooperate with a common record element.

Referring first to FIGURES 4 and 6, a record element in the form of a paper strip or chart is indicated by the letter C. As seen in FIGURE 4, this strip is supplied from a reel or spool 10 and passes over guide rollers 11 and also a backing table 12, the strip being ultimately wound up upon spool 13. The table 12 supports the paper strip in the region where the recording devices cooperate with the paper to apply the record traces, as clearly indicated in FIGURES 4 and 6.

As also seen in FIGURES 4 and 6, the apparatus includes a mounting plate 14 for supporting or carrying the several recording instruments, each one of which is constructed as described below with reference to various of the other figures. Each device or instrument includes a stylus 15 adapted to be driven or actuated by a galvanometer, certain parts of one of which appear in FIGURE 4. Thus, in FIGURE 4 the armature or rotative portion of a galvanometer is fragmentarily indicated at 16, the outline of this armature also appearing in dotted lines in FIGURES 1 to 3. The armature may be suitably journalled, for instance by means of shafts 17 and 18, the first of which is carried in a bearing 19 mounted on the base plate 14 and the latter of which is carried in a bearing 20 mounted in a suitable frame part 21.

In the above arrangement, the shaft 17 is a shaft which is oscillatable in accordance with variations of a voltage applied to the galvanometer, and in certain prior art recording instruments a stylus is directly mounted upon such a shaft and thereby produces arcuate traces upon a strip chart or other record element.

In accordance with the present invention, the stylus 15 of the instrument is actuated or driven by the oscillatable shaft 17 by means of a special form of linkage now to be described. This linkage includes a lever 22 which is fixed to the shaft 17. Another lever 23 is pivotally mounted at 24 on a mounting plate or bracket 25, the bracket 25 being positioned adjacent to the main support plate 14, and having an aperture through which the oscillative shaft 17 passes, as may be seen in FIGURE 4. The free ends of the levers 22 and 23 are pivotally interconnected by means of a link 26, the pivot between this link and the lever 22 being indicated at 27 and the pivot between the link and the other lever being indicated at 28. A bracket 29 fixed to the link 26 serves to mount the stylus 15, the mounting including a pair of pins 30 projecting from opposite sides of the stylus and engaging in V-notches formed in parts of the bracket 29, as clearly seen in FIGURES 1 to 4. A spring element 31 also fastened to the link 26 and extended up over the parts of the bracket 29 to engage the heel end of the stylus serves to hold the stylus in its position with the pins 30 engaged in the V-notches and with the writing tool or pen tip 32 (see FIGURE 4) in engagement with the chart C.

The pen tip may be fed through a tube 33 comprising the outer portion of the stylus and receiving its supply of ink through a tube 34 which is extended to a reservoir or ink supply and which is desirably flexible so as not to interfere with the motion of a stylus when actuated by the galvanometer.

Figures 1, 2:
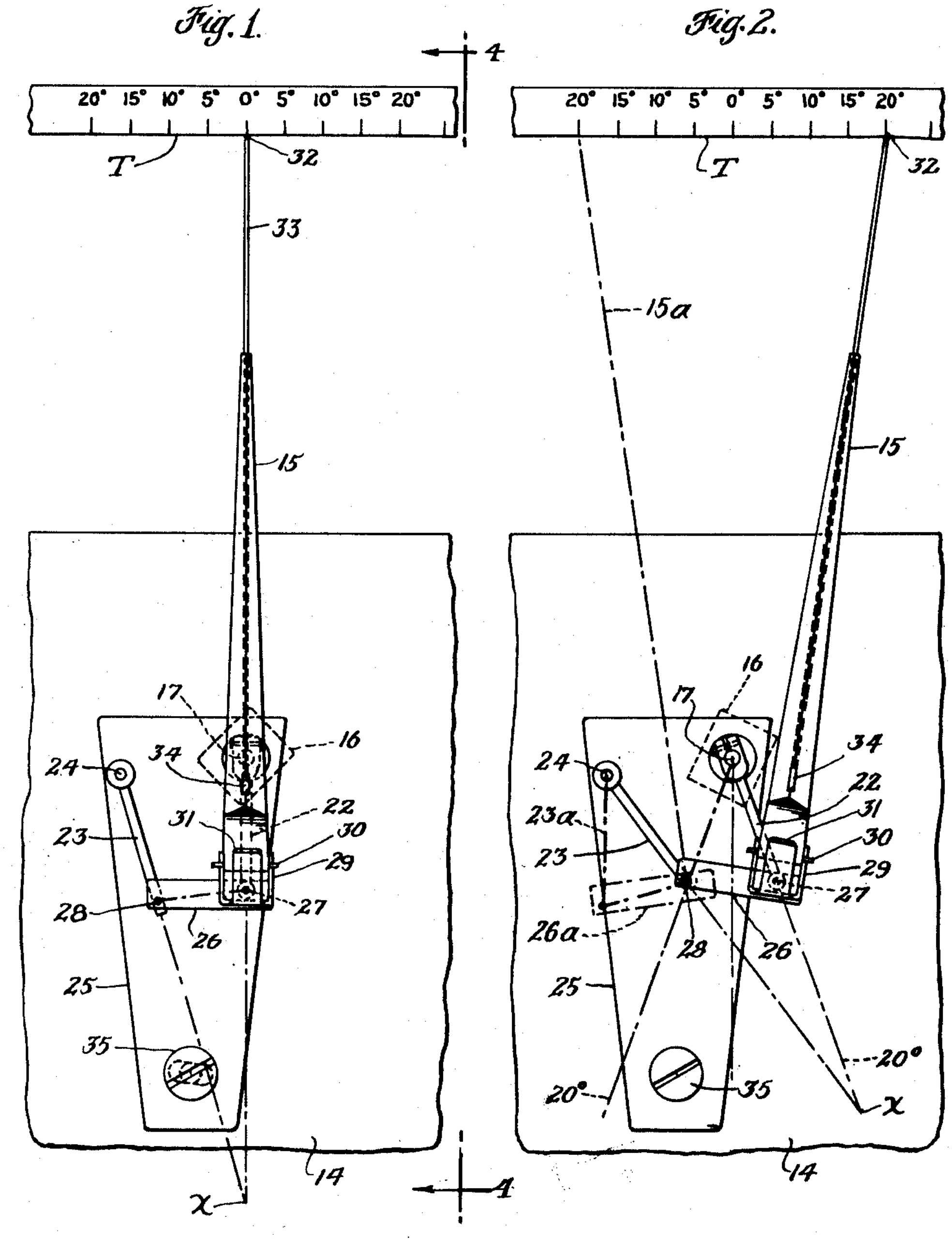
FIGURE 1 is a plan view of a recording stylus and of mechanism arranged in accordance with the present invention to actuate the stylus from the oscillative shaft of a galvanometer, this view showing the stylus in mid position.
FIGURE 2 is a view similar to FIGURE 1 but illustrating the stylus in full lines in a position deflected to the right of the mid position of FIGURE 1 and further indicating in dot and dash lines a deflected position to the left of the mid position.
Figure 3:
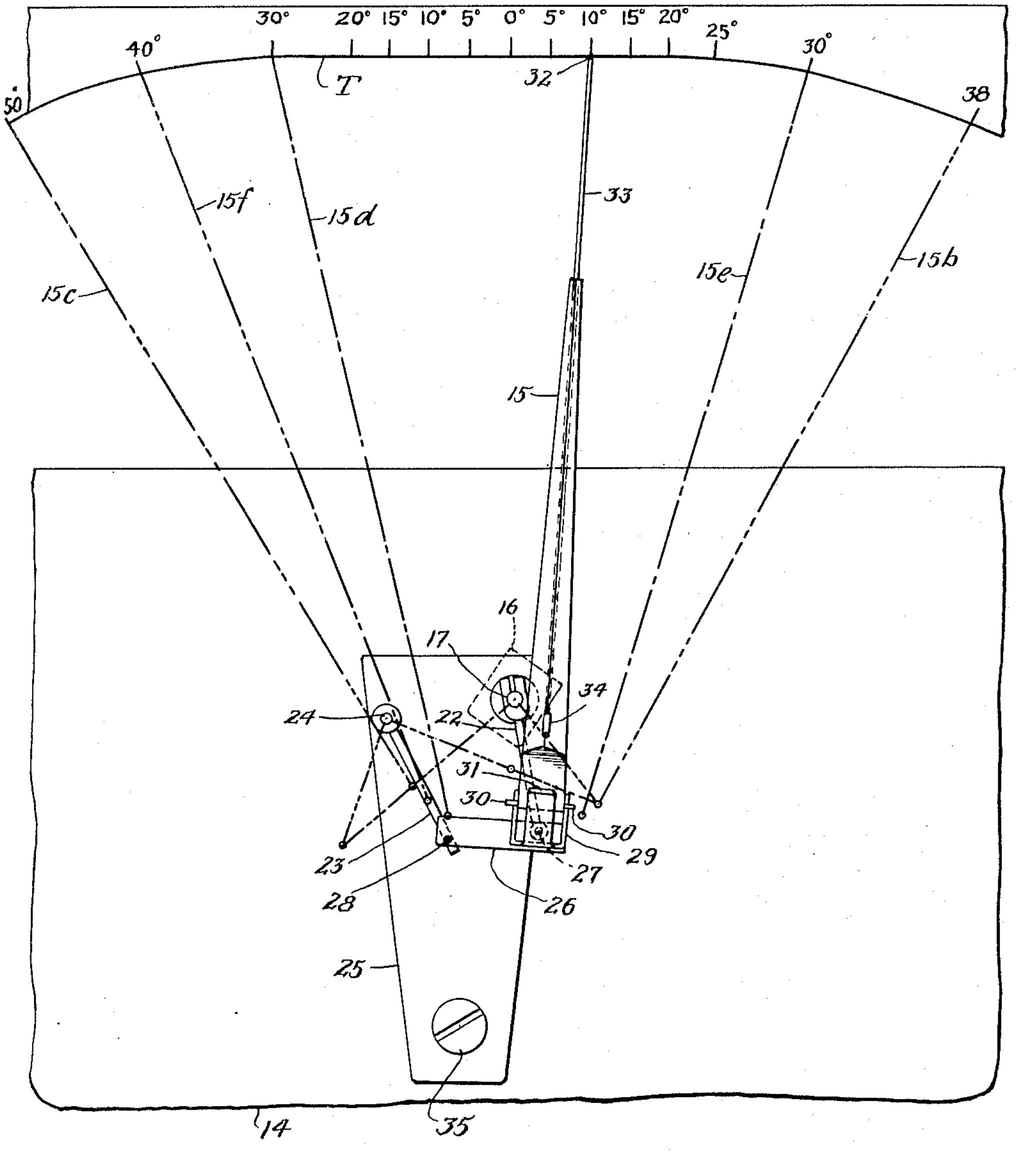
FIGURE 3 is a view similar to FIGURES 1 and 2 but illustrating in full lines still another position of the stylus and also diagrammatically indicating certain other positions, as will further be described.

From FIGURES 1, 2 and 3, it will be noted that the levers 22 and 23 are of approximately the same length and further that said levers extend in the same general direction from their mounting axes, but with their free ends converging somewhat toward each other.

Referring particularly to FIGURE 1, it is to be noted that as there shown, the stylus occupies a mid position which is indicated toward the top of the figure by the zero marking on the scale. In this figure, and also in FIGURES 2 and 3, the line T indicates the trace made by the pen tip moving in each direction from the mid position of FIGURE 1, this line or trace being here shown as it would appear without any motion of a travelling record element such as shown in FIGURES 4 and 6. In other words the line T represents the path of movement in space of the pen tip as a result of deflection of the galvanometer to either side of its mid position.

For the purpose of comparing and analyzing the line T in relation to the angular motions of the shaft 17 of the galvanometer, there have been applied to the line T a series of numbered scale markings at each side of the zero position shown in FIGURE 1. These scale markings and their numerical values represent the position of the pen tip accompanying angular deflection of the shaft 17 through the number of degrees indicated on the scale. In other words and by way of example, the scale marking "15" indicates the position occupied by the pen tip when the shaft 17 is angularly deflected 15° from the mid position indicated by "0" in the figures.

With the foregoing in mind, it will now be seen that with the mid position considered to be that shown by "0" in FIGURE 1, in which the pen tip is located on a line passing through the axis of oscillation of the shaft 17 and the axis of the pivot 27 connecting the lever 22 with the link 26, the line or trace T is substantially straight at both sides of zero up to points corresponding to 20° of deflection of the shaft 17 and thus of the armature of the galvanometer. The position of the parts at this 20° deflection to the right in FIGURE 2 is indicated in full lines in that figure; and the position of the parts with deflection of 20° to the left in FIGURE 2 is indicated by the dot-dash lines *15a–22a*, *23a* and *26a*.

In FIGURE 3 there is illustrated in full lines the positions of the parts representing a deflection of the stylus 10° to the right of zero. FIGURE 3 still further illustrates diagrammatically a number of additional positions including an extreme both to the right and to the left of mid position. Among the positions here shown, in one position indicated by *15b*, which represents the extremity of the right hand excursion of the stylus, where the arm 23 and the link 26 occupy positions in alignment with each other; and in that position the shaft 17 has rotated 38° from the mid position, as is shown on the scale at the top of the figure. Similarly at the opposite side of the figure, as indicated at *15c*, there is a diagrammatic representation of the position of the stylus when the lever 22 reaches a position in alignment with the link 26, this position corresponding to a deflection of the galvanometer shaft 50° in the opposite direction from mid position.

FIGURE 3 also shows a position marked *15d* representing the stylus location when the shaft 17 is deflected 30° in one direction from mid; and the figure shows at *15e* the corresponding position of the stylus for 30° deflection of the shaft 17 in the opposite direction. Still further, the line *15f* shows the 40° position at the left hand side of the figure.

From FIGURE 3 it will be seen that at the left hand side, the line T does not appreciably depart from straight until approximately the 30° position, after which the line curves downwardly or drops off quite quickly. At the other side, the line T starts to drop off shortly after the 20° position and drops off quite quickly as 30° is approached.

The central portion of the line, although not exactly straight, quite closely approximates a straight line and furthermore as will be seen from the degree markings on the scale, the increments of movement of the pen tip very closely maintain proportional relationship to the angular motion of the shaft 17 and thus of the galvanometer.

It will therefore be seen that with the instrument as described and illustrated, substantially straight line and linear response is obtained with deflection up to about 20° from either side of the mid position.

Although the stylus 15 would not necessarily have to be as long as shown in the drawings, nevertheless the pen tip should be located at a distance from the pivot 27 at the free end of lever 22 at least somewhat greater than the length of the lever 22 and preferably the pen tip is located at a distance at least several times the length of the lever 22 in order to expand the recording motion of the pen.

From FIGURE 3 it will further be seen that in the end portions of the range in either direction from zero, the trace T not only drops away from the straight line path, but in addition the incremental movement of the pen tip no longer maintains the same proportional relationship to the angular motion of the galvanometer shaft 17.

For some purposes slight deviation from linear respose may be tolerable, for instance, the deviations introduced in the region of a deflection of about 30° or 35° from mid position, but for high accuracy it is preferred to operate within about the 20° to 25° range at either side of zero, because of the substantially straight line and accurate response obtainable in this range.

For the purpose of centering the action of the instrument on the desired mid position (either a mid position such as indicated by zero in FIGURES 1, 2 and 3, or any other selected mid position) the mounting plate 25 for the actuating linkage for the stylus is desirably arranged for shifting movement, preferably angular shifting movement about the axis of the galvanometer shaft 17; and means is provided for fixing the plate 25 in any selected position. Thus, as shown in FIGURES 1 and 4, a fastening screw 35 passing through the plate 14 also extends through an elongated slot 36 formed in the plate 25, thereby permitting shifting of the position of the plate 25 with reference to the remainder of the structure, such as the plate 14.

It should be understood that while for certain purposes it may be desirable to associate a scale with an instrument of the kind herein disclosed, for instance a scale of the type shown in FIGURES 1 and 3, for various other purposes and especially for use of the instrument for recording purposes on a travelling chart, no scale would necessarily be used, although base or reference lines may be applied to the chart so that the traces made by one or more of the instruments used in association with a chart may be read in association with base lines, or may conveniently be compared one with another. With instruments of the kind herein disclosed, simple for instance straight reference lines will serve for direct comparison of the traces made by several instruments, curvilinear coordinates not being required for reasons already noted. A multiple setup with multiple traces being formed is indicated somewhat diagrammatically in FIGURE 6.

With respect to the proportioning and arrangement of the various parts of the recording system as above described and as illustrated in the drawings, it will be observed that in the arrangement of FIGURES 1 to 3, the length of the two levers 22 and 23 is approximately the same and further that while the levers 22 and 23 extend in the same general direction from their mounting pivots, nevertheless they somewhat converge toward their free ends, i.e., the ends which are interconnected by the link 26. In view of this arrangement, the stylus and the pen tip or writing tool carried thereby moves about a point marked *x* in FIGURES 1 and 2, which point represents the point of intersection of lines passing through the pivot points at the two ends of each of the two levers 22 and 23. In addition to the pivotal or angular motion of the stylus about this point *x*, it is further to be noted that point *x* shifts in position toward that side to which any particular deflection of the stylus is occurring. It is the compound of these motions (the pivotal motion of the stylus about the point *x* and the shifting of the point *x*) which produces the substantially straight line and linear response, and this occurs throughout an appreciable range toward either side of the mid position and until the angle between the link 20 and one or the other of levers 22 and 23 enlarges extensively beyond the generally right angle relationship. In connection with this matter it will be understood where reference is made herein to the angle between the link 26 and the levers 22 and 23, the reference is to the linking axis between the pivots 27 and 28, and not merely to any structural axis of the link itself, as the structure of the link may take a variety of forms without altering the action of the stylus.

The arrangement as described above and illustrated in FIGURES 1 to 6 provides substantially rectilinear pen response with a minimum of friction in the mounting and actuating parts for the stylus, the entire mechanism having only three simple pivots which may readily be made virtually frictionless especially in comparison with sliding joints, as proposed in other prior equipment.

It is also to be understood that variations in proportioning of parts and also in locations of the pivots, as compared with those illustrated in FIGURES 1 to 6 may be employed and still provide sufficiently straight and sufficiently accurate response for many purposes. However, for attainment of a high degree of accuracy, the following geometric parameters are preferably observed:

First, the location of the recording tool at the tip of the stylus and the arrangement of the levers 22 and 23 and the link 26 is preferably such that the distance from the axis of the link pivot on lever 22 to the point (*x*) of intersection of the axes of the two levers extended generally approximates the mean proportional between the length of the lever 22 and the distance between the recording tool and the axis of the link pivot on lever 22 when the recording tool 32 is in the mid position referred to. Adoption of this proportion in connection with the location of the recording tool aids in minimizing deviations from rectilinearity in the motion of the recording tool. In the embodiment shown in FIGURES 1 to 6 the distance from the axis of the link pivot to the point of intersection of the axes of the levers extended is somewhat smaller than the mean proportional between the lever length and the effective stylus length, but some leeway is here permissible and indeed may be preferable depending upon other variations in the particular geometry of the linkage employed. Deviation from this mean proportional relationship by as much as 20 to 30 percent will not seriously impair the result obtained.

Second, in the arrangement of FIGURES 1 to 6, with the levers 22 and 23 somewhat convergent, the link 26 is somewhat shorter than the spacing between the mounting axes for the two levers, and the length of the link is preferably not greater than about the length of one of the levers. Diminishing the link length favorably influences rectilinearity but at very small values for the link length errors introduced by slope in the pivots are undesirably magnified.

The parameters employed to attain maximum accuracy are further considered hereinafter with particular reference to FIGURES 8 and 9.

When employing linkage of the general kind shown in FIGURES 1 to 6, the location of the mounting pivot 24 for the lever 23 angularly about the axis of the shaft 17 will determine the mid or zero position of the effective range of the instrument. In general, when the recording tool is in a mid position such as is illustrated in FIGURE 1, the mounting pivot 24 is preferably located approximately on a perpendicular to the line joining the recording tool at the tip of the stylus and the axis of the oscillatable shaft 17 and passing through the axis of the oscillatable shaft. In the embodiment shown in FIGURES 1 to 3, the mounting pivot 24 is slightly displaced from the position just referred to, in a direction toward the link 26, but the location of the mounting pivot 24 could even be displaced somewhat in the opposite direction without severely distorting the response.

Figure 7:
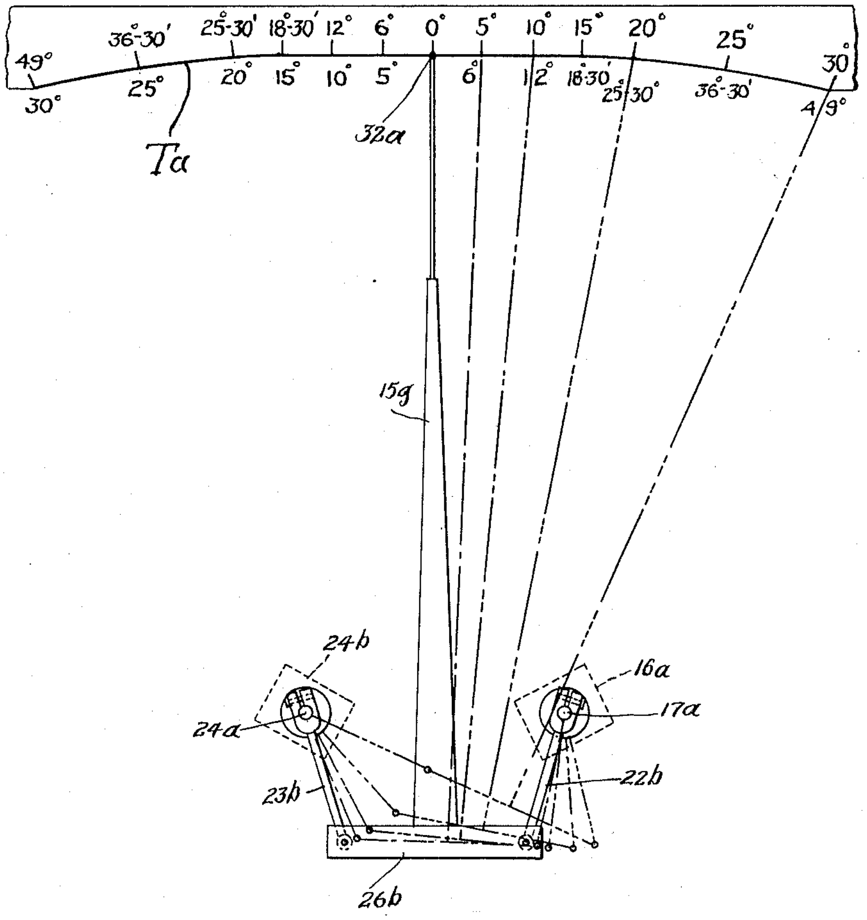
FIGURE 7 is a view similar to FIGURE 3 illustrating a modified arrangement.

Turning now to the arrangement shown in FIGURE 7, it is first to be noted that in this embodiment, the oscillatable shaft **17*a* is again associated with a galvanometer, a part of which is indicated at 16*a*. However, in contrast to the arrangement of FIGURES 1 to 6, the mounting pivot for the second lever 23*b* comprises an oscillatable shaft 24*a* associated with a second galvanometer, a part of which is indicated at 24*b*. As in the first embodiment a lever 22*b* is associated with the first oscillatable shaft 17*a* and a link 26*b*** pivotally interconnects the two levers.

In the embodiment of FIGURE 7 the link **26*b* carries a stylus 15*g* having a recording tool 32*a* adapted to record a trace on a travelling record element in the manner already described above. As before, the levers 22*b* and 23*b* are somewhat convergent toward their free ends and are preferably of the same length, being interconnected by the link 26*b* which in contrast to the arrangement of FIGURES 1 to 6, is substantially twice that shown in FIGURES 1 to 3. At the same time, however, instead of positioning the stylus and the recording tool along a line passing through the oscillatable shaft and the link pivot on the arm carried by that shaft (as in FIGURES 1 to 6) the stylus 15*g* in the arrangement of FIGURE 7 and the recording tool 32*a* carried thereby is positioned in a mid plane between the two oscillatable shafts 17*a* and 24*a*. The recording tool 32*a* is thus arranged symmetrically with respect to the remaining parts of the instrument, being located in a plane midway between the axes of the two oscillatable shafts 17*a* and 24*a*** when the instrument is in its mid position. All of the other parts of the system are also arranged or located in a symmetrical pattern, when the recording tool is in the mid position.

From the above it will be noted that although the total length of the link **26*b*** is of the general order of magnitude of twice that used in FIGURES 1 to 3, nevertheless the distance from the free end of either of the levers to the mid plane in which the stylus and the recording tool is located is a distance similar to that used in FIGURES 1 to 3, i.e., is preferably somewhat less than the length of one of the levers. This proportioning is comparable to the preferred proportioning of the link length to the lever length in the embodiment of FIGURES 1 to 6 in which the stylus and recording tool instead of being located in a plane passing through the center of the link is located in a plane toward one side of the instrument when the parts are in mid position.

Although in FIGURE 7, as in FIGURES 1 to 6 inclusive, the distance from the axis of the link pivots on one of the levers to the point of intersection of the axis of the two levers extended generally approximates the mean proportional between the length of one of the levers and the distance between the recording tool and the axis of the link pivot on the first lever referred to, preferably the proportioning of parts in FIGURE 7 is slightly different than just referred to and is such that the distance from the axis of the link pivot on one of the levers to the point of intersection of the axes of the two levers extended generally approximates the mean proportional between the length of either of the levers and the perpendicular distance from the recording tool to a line intersecting the axes of the lever pivots at the two ends of the link when the recording tool is in the mid position. As in the arrangement of FIGURES 1 to 6 it is also tolerable in the arrangement of FIGURE 7 to employ dimensions and pivot locations providing some appreciable deviation from the mean proportional relationship just referred to. For instance, deviations up to 20 or 30 percent will for most purposes be acceptable.

One of the advantages of the embodiment of FIGURE 7 lies in the use of two galvanometers for driving the instrument, instead of only one as in FIGURES 1 to 6. In FIGURE 7 it is contemplated that the two galvanometers be subjected to the same potential corresponding to a variable to be recorded, so that the two galvanometers act in unison in driving the linkage and thus the recording tool. Because of the convergence of the free ends of the two levers **22*b* and 23*b*, the angular motion of the two shafts 17*a* and 24*a* will not exactly correspond, so that with a deflection in one direction from mid or zero, one of the galvanometers would place a small load on the other and with a deflection in the other direction from mid, the loading would be reversed. This effect, however, is minor especially within the main working range of the instrument, namely a range corresponding to approximately twenty-five degrees of angular motion of the oscillatable shafts 17*a* and 24*a*** in either direction from mid position, as is clearly indicated by the trace T*a* which has been applied to FIGURE 7 toward the top thereof in a manner similar to the trace T shown in FIGURES 1 to 3.

Along the trace T*a* at the top of FIGURE 7 scale markings have been applied in order to illustrate the relationship between the motion of the oscillatable shafts **17*a* and 24*a* and the motion of the recording tool 32*a***. Above the line T*a* the markings indicate the position of the recording tool with various angular deflections from the zero point of the right hand oscillatable shaft **17*a*, the numerals below the line indicating the corresponding angular positions of the left hand oscillatable shaft 24*a***.

From FIGURE 7 it will be seen that here again substantially straight line and linear response is obtainable with the present invention within a reasonable working range of the instrument. While the arrangement of FIGURE 7 is not quite as accurate as that of FIGURES 1 to 6, it is nevertheless sufficiently close to rectilinearity to permit of its use for many purposes.

By employment of an instrument of the kind shown in FIGURE 7 more power is available for driving the recording tool, because of the use of a pair of galvanometers in tandem, while at the same time substantial rectilinearity is obtained, with the several advantages hereinabove fully brought out.

Figure 8:
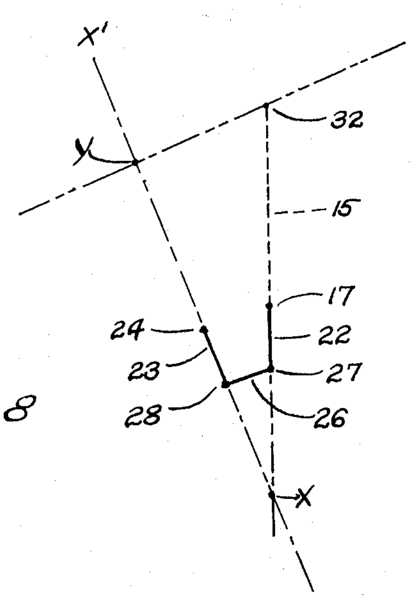
FIGURES 8 and 9 are diagrammatic illustrations of certain linkages employed.

In laying out an instrument of the kind shown for example in FIGURES 1, 2 and 3, maximum accuracy of repsonse and a maximum range of substantial rectilinearity will be obtained if the following procedure is adopted:

Referring to FIGURE 8, which illustrates an arrangement of the general type of FIGURES 1 to 3, after determining a certain practical length for the lever 22 which is mounted on the oscillatable shaft 17, and after establishing the desired length of the stylus 15, point *x* is advantageously located along the axis of lever 22 extended in a direction opposite to the location of the recording tool 32, when the oscillatable shaft 17 is in mid position. This point *x* marks off the distance from the free end 27 of lever 22 representing the mean proportional between the length of the lever 22 and the distance between the recording tool 32 and the free end 27 of the lever 22. An axis line such as shown at *x*–*x'* in FIGURE 8 is then projected through point *x* and the second lever 23 is positioned with its axis along that axis line. For maximum accuracy the free end of the second lever is spaced from point *x* in the general direction of the recording tool and the second lever is made to be of such length that the distance of its free end from the point *x* approximates the mean proportional between the length of the second lever and the distance from the free end of the second lever to a point on the axis line of the second lever established by the point of intersection *y* of a perpendicular from the recording tool to said axis line *x*–*x'*. Thus, the second lever may be of various lengths, provided it is positioned along the axis line *x*–*x'* in the manner just specified. When the length and position of the second lever has been established, the link 26 may then be proportioned to provide for the pivotal interconnection of the two levers at points 27 and 28, and the recording stylus, as already explained above, is connected with the link 26.

Figure 9:
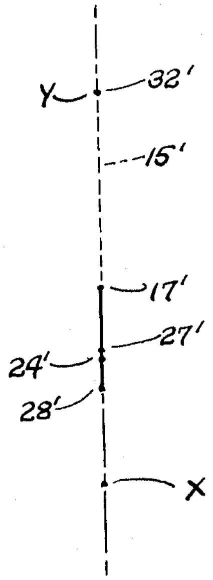

From the foregoing analysis it will further be seen that if desired the lever 23 may be made collinear with the lever 22, for instance in the manner diagrammatically illustrated in FIGURE 9 in which it will be seen that the mounting pivot 24' and the free end 28' of the second lever are located along the axis line extended between the point *x* and the recording tool indicated at 32', which line also passes through the axis of the oscillatable shaft 17', as well as through the pivot 27' at the free end of the first lever. In this pattern of the linkage as well as in other forms it will be understood that the link between the two levers will interconnect points 27' and 28'. However, in the arrangement of FIGURE 9 the stylus 15' will extend generally in alignment with the link itself, thus, in effect constituting a continuation of said interconnecting link, which is in contrast with the arrangement of FIGURES 1 to 3 in which the stylus extends in a direction generally transverse the extension of the link. In FIGURE 9, the point 32' is also identified by the letter *y* because in effect the arrangement of FIGURE 9 represents the limiting position of the second lever in which the axis line thereof is collinear with the axis line of the first lever.

I claim:

1. Recording equipment comprising, in combination with a travelling record element and with a shaft oscillatable about its axis in either direction from a mid position in accordance with a variable to be recorded on said element, a first lever connected with said shaft to oscillate therewith, a second lever pivotally mounted on an axis paralleling the axis of said shaft, said two levers being extended generally in the same direction from their mounting axes, a link pivotally interconnecting the free ends of said levers, and a stylus arm connected with said link to move therewith in its pivotal motion and carrying a recording tool cooperating with said record element and located approximately on a line passing through the axis of oscillation of said shaft and the axis of the pivot of the link on said first lever when the oscillatable shaft is in its mid position, said tool further being located on said line and at the side of the oscillatable shaft opposite said link.

2. A construction according to claim 1 in which the recording tool cooperates with the record element at a distance from the axis of said oscillatable shaft several times the length of said first lever.

3. A construction according to claim 1 and further including mounting means providing for shifting of the location of the mounting pivot for the second lever approximately in an arcuate path about the axis of said oscillatable shaft.

4. Recording equipment comprising, in combination with a travelling record element and with a shaft oscillatable about its axis in either direction from a mid position in accordance with a variable to be recorded on said element, a first lever connected with said shaft to oscillate therewith, a second lever pivotally mounted on an axis parelling the axis of said shaft, said two levers being extended generally in the same direction from their mounting axes but with their free ends converging toward each other, a link pivotally interconnecting the free ends of said levers, and a stylus arm connected with said link to move therewith in its pivotal motion and carrying a recording tool cooperating with said record element and located approximately on a line passing through the axis of oscillation of said shaft and the axis of the pivot of the link on said first lever when the oscillatable shaft is in its mid position, said tool further being located on said line and at the side of the oscillatable shaft opposite said link, the distance from the axis of the link pivot on the first lever to the point of intersection of the axes of the two levers extended generally approximating the mean proportional between the length of the first lever and the distance between the recording tool and the axis of the link pivot on the first lever when the recording tool is in the mid position.

5. Recording equipment comprising, in combination with a travelling record element and with a shaft oscillatable about its axis in either direction from a mid position in accordance with a variable to be recorded on said element, a first lever connected with said shaft to oscillate therewith, a second lever pivotally mounted on an axis paralleling the axis of said shaft, said two levers being extended generally in the same direction from their mounting axes, but with their free ends converging toward each other, a link pivotally interconnecting the free ends of said levers, and a stylus arm connected with said link to move therewith in its pivotal motion and carrying a recording tool cooperating with said record element and located at the side of the oscillatable shaft opposite to the link.

6. A construction according to claim 5 in which the distance from the axis of the link pivot on the first lever to the point of intersection of the axes of the two levers extended generally approximates the mean proportional between the length of the first lever and the perpendicular distance from the recording tool to a line intersecting the axes of the lever pivots at the two ends of the link when the recording tool is in a position corresponding to the mid position of oscillation of said oscillatable shaft.

7. Recording equipment comprising in combination with a travelling record element, a pair of galvanometers each with a shaft oscillatable about its axis in either direction from a mid position in accordance with a variable to be recorded on said element, a first lever connected with one of said shafts to oscillate therewith, a second lever connected with the second of said shafts to oscillate therewith, said two levers being of substantially the same length and extended generally in the same direction from the axes of their mounting shafts but with their free ends converging toward each other, a link pivotally interconnecting the free ends of said levers, and a stylus arm connected with said link to move therewith in its pivotal motion and carrying a recording tool cooperating with said record element and located at the side of the oscillatable shafts opposite to the link.

8. Recording equipment comprising, in combination with a travelling record element and with a shaft oscillatable about its axis in either direction from a mid position in accordance with a variable to be recorded on said element, a first lever connected with said shaft to oscillate therewith, a second lever pivotally mounted on an axis paralleling the axis of said shaft, said two levers being extended generally in the same direction from their mounting axes, a link pivotally interconnecting the free ends of said levers, and a stylus arm connected with said link to move therewith in its pivotal motion and carrying a recording tool cooperating with said record element and located approximately on a line passing through the axis of oscillation of said shaft and the axis of the pivot of the link on said first lever when the oscillatable shaft is in its mid position, said tool further being located on said line and at the side of the oscillatable shaft opposite said link, said second lever being positioned to extend along an axis line passing through a point on the extended axis of the first lever located at a distance from the free end of the first lever when in the mid position, which distance is the mean proportional between the length of the first lever and the distance between the recording tool and the axis of the link pivot on the first lever, including that limiting position of the second lever in which the axis line thereof is colinear with the axis line of the first lever, and the free end of the second lever being spaced from said point in the general direction of the recording tool and the second lever being of length such that the distance of such spacing when in the mid position approximates the mean proportional between the length of the second lever and the distance from the free end of the second lever to a point on the axis line of the second lever established by the point of intersection of a perpendicular from the recording tool to said axis line.

References Cited by the Examiner

UNITED STATES PATENTS

| | | | |
|---|---|---|---|
| 2,651,754 | 9/53 | Perry | 324—92 |
| 2,814,549 | 11/57 | Perry | 346—139 |

OTHER REFERENCES

Mechanism (Beggs), published by McGraw-Hill 1955 (pages 205–206 relied on).

ROBERT L. EVANS, *Primary Examiner.*

LEO SMILOW, *Examiner.*